United States Patent [19]

Hibst et al.

[11] Patent Number: 4,675,170

[45] Date of Patent: Jun. 23, 1987

[54] PREPARATION OF FINELY DIVIDED ACICULAR HEXAGONAL FERRITES HAVING A HIGH COERCIVE FORCE

[75] Inventors: Hartmut Hibst, Ludwigshafen; Peter Rudolf, Maxdorf; Graham E. McKee, Weinheim, all of Fed. Rep. of Germany

[73] Assignee: BASF Aktiengesellschaft, Ludwigshafen, Fed. Rep. of Germany

[21] Appl. No.: 732,309

[22] Filed: May 9, 1985

[30] Foreign Application Priority Data

May 14, 1984 [DE] Fed. Rep. of Germany ....... 3417793

[51] Int. Cl.$^4$ .............................................. C01G 49/00
[52] U.S. Cl. ................................... 423/594; 423/632; 423/636
[58] Field of Search ............... 423/594, 593, 637, 626, 423/635, 632

[56] References Cited

U.S. PATENT DOCUMENTS

| 3,082,067 | 3/1963 | Hund | 23/200 |
|---|---|---|---|
| 3,093,589 | 6/1963 | Downs | 252/62.5 |
| 3,382,174 | 5/1968 | Hund | 252/62.57 |
| 3,582,266 | 6/1971 | Sopp et al. | 423/594 |
| 3,723,587 | 3/1973 | Iwase | 264/61 |
| 3,793,443 | 2/1974 | Arendt | 423/594 |
| 3,903,228 | 9/1975 | Riedl et al. | 264/108 |
| 3,904,540 | 9/1975 | Bennetch et al. | 252/62.54 |
| 4,042,516 | 8/1977 | Matsumoto et al. | 252/62.54 |
| 4,116,752 | 9/1978 | Matsumoto et al. | 423/594 |
| 4,176,172 | 11/1979 | Bennetch et al. | 423/634 |
| 4,189,521 | 2/1980 | Glass et al. | 423/594 |
| 4,401,643 | 8/1983 | Hibst et al. | 423/594 |
| 4,411,807 | 10/1983 | Watanabe et al. | 423/594 |
| 4,512,906 | 4/1985 | Hayakawa et al. | 423/594 |
| 4,539,129 | 9/1985 | Nagai et al. | 423/594 |
| 4,582,623 | 4/1986 | Kubo et al. | 423/594 |

OTHER PUBLICATIONS

R. Takada et al: Proc. Intern. Conf. on Ferrites, Jul. 1970, Japan, pp. 275-278.

L. Girada et al: Journal de Physique, Suppl. 4.38, 1977, p. C1-325.

Primary Examiner—William R. Dixon, Jr.
Assistant Examiner—Anthony McFarlane
Attorney, Agent, or Firm—Keil and Weinkauf

[57] ABSTRACT

A process for the preparation of finely divided acicular hexagonal ferrites which have a high coercive force and are of the general formula $MFe_{12}O_{19}$, where M is barium or strontium, and their use for the production of magnetic recording media and plastoferrites.

15 Claims, No Drawings

PREPARATION OF FINELY DIVIDED ACICULAR HEXAGONAL FERRITES HAVING A HIGH COERCIVE FORCE

The present invention relates to a process for the preparation of finely divided acicular hexagonal ferrites which have a high coercive force and are of the general formula $MFe_{12}O_{19}$, where M is barium or strontium.

For a number of applications in the field of forgery-proof coding, for example for identity cards, credit cards, and the magnetic storage of other characteristic data, it is desirable to have magnetic recording media whose coercive force is higher than that of the current standard storage media. Appropriate materials would be less insensitive to stray magnetic fields and hence more difficult to forge.

Furthermore, according to Utility Model No. 82 33 253 plastoferrite materials having a very high coercive force are required for the production of print-through-echo-erasing means in tape cassettes, in order to increase the signal to print-through ratio of magnetic tapes.

Hexagonal ferrites of the general formula $MFe_{12}O_{19}$, where M is barium or strontium, are usually used for this purpose.

Ferrite powders for the production of substantially forgery-proof magnetic recordings are usually prepared by a ceramic method. For this purpose, barium carbonate or strontium carbonate and iron oxide are mixed in a ratio corresponding to the chemical formula of the subsequent ferrite, and this mixture is subjected to a heat treatment, i.e. pre-sintering, at from 1,100° to 1,300° C., which results in the formation of the magnetic hexaferrite. The sintered crystallite agglomerates formed are then milled to a powder having a particle size of about 1 μm, milling generally being carried out with the addition of water. Milling produces crystal defects in the particles, and these defects result in a decrease in the coercive force. Ferrite powders prepared in this manner generally have a very good specific remanent magnetization, but the coercive force $H_c$ is very low, being about 200 kA/m before milling and less than 150 kA/m after the milling procedure. These crystal defects caused by milling can be only partially repaired by heating after milling, or by a sintering process, coercive forces as high as 300 kA/m being obtained. However, the disadvantage of this subsequent heating is that the pigment becomes much coarser. If a coarse barium ferrite powder obtained in this manner by milling and subsequent heating is incorporated into a plastic melt so that the degree of filling is high, the result is a very sharp decrease in the coercive force owing to the kneading process required.

Hexagonal ferrite powders are also prepared by conventional flux methods in which fluxes, eg. $B_2O_3$, alkali metal borates, PbO, alkali metal ferrites, $Bi_2O_3$, molybdates, alkali metal halides and alkali metal sulfates, are used to promote the reaction between the individual metal oxides. For example, according to U.S. Pat. No. 3,093,589, barium ferrite is prepared by heating a mixture of $BaCO_3$, acicular $\alpha$-FeOOH and from 0.1 to 1% by weight of barium chloride, which acts as a catalyst, at from 890° to 980° C. Irregular tabular crystals with straight edges are obtained. U.S. Pat. No. 3,793,443 describes a process for the preparation of $BaFe_{12}O_{19}$ powder from a mixture of $BaCO_3$, FeOOH and an alkali metal chloride by heating at 1,000° C. After the alkali metal halide has been washed out, regular tabular hexagonal crystals are obtained. U.S. Pat. No. 3,903,228 discloses a process in which a homogeneous mixture of $BaCO_3$ and finely divided acicular $\alpha$-$Fe_2O_3$ having a specific surface area greater than 20 m²/g is heated with from 3 to 10% by weight of NaF at from 950° to 1,100° C. After washing, tabular crystals having a diameter of less than 1 μm are obtained. According to U.S. Pat. No. 4,042,516, heating a mixture of 1 mole of $SrCO_3$, 6 moles of acicular $\alpha$-FeOOH and from 0.05 to 2 moles of $SrCl_2$ at 1,000°0 C., followed by extraction with water, gives tabular Sr ferrite having a platelet size of about 2 μm. The flux methods have the great disadvantage that the products obtained in the heat treatment generally have to be freed from the catalytic flux by a process which involves washing with water or dilute acids. Moreover, the added fluxes are generally highly corrosive and can both damage the crucible material used and, because they are very volatile, destroy the furnace employed.

Processes for the preparation of barium ferrite, in which the starting material used is a specific iron oxide hydroxide powder and no catalytic fluxes are added, have also been disclosed. For example, German Published Application DAS No. 1,911,318 describes a process for the preparation of magnetically anisotropic permanent magnets by subjecting a molding consisting of $BaCO_3$ and acicular $\alpha$- or $\gamma$-FeOOH to a single heat treatment at from 1,190° to 1,300° C., in which process the FeOOH needles are mechanically aligned by the compression-molding procedure at right angles to the direction in which the pressure is applied. U.S. Pat. No. 3,723,587 describes a two-stage process for the preparation of magnetically anisotropic permanent magnets, in which a mixture of $BaCO_3$ and acicular $\alpha$-FeOOH is premolded and the resulting molding is preheated at 1,000° C. and then compression-molded under a pressure greater than that employed in the premolding step. Further heating is then carried out at 1,250° C. Japanese Pat. No. 5 4142-198 describes a process for the preparation of tabular Ba ferrite and Sr ferrite, in which the starting material used is a filter cake consisting of oriented $BaCO_3$ or $SrCO_3$ and acicular $\alpha$-FeOOH particles. In this process, a suspension of $BaCO_3$ or $SrCO_3$ and acicular $\alpha$-FeOOH is filtered in a special manner, e.g. by means of gravity filtration, so that in the resulting filter cake the FeOOH needles lie parallel to its surface and are embedded in finely divided $BaCO_3$ or $SrCO_3$. The resulting filter cake, in its entirety in uncomminuted form, or in the form of 10–20 mm cubes, is heated at 1,100° C., the FeOOH needles reacting with $BaCO_3$ or $SrCO_3$ and coalescing to form tabular hexagonal ferrite having a particle diameter of from 0.5 to 1.5 μm. The sintered product obtained is then pulverized. The resulting barium ferrite powders have a coercive force of 200 kA/m, and the strontium ferrite powders obtained have a coercive force of 223 kA/m. R. Takada et al. (Proc. Intern. Conf. on Ferrites, July 1970, Japan, pages 275–278) have examined, with the aid of an electron microscope, $SrFe_{12}O_{19}$ permanent magnets produced by subjecting moldings consisting of $SrCO_3$ and acicular $\alpha$-FeOOH to a single sintering treatment at from 1,200° to 1,300° C. In this procedure, Sr ferrite formation takes place topotactically in the moldings, the crystallographic (100) plane of the $\alpha$-FeOOH being converted to the (0001) plane of the $SrFe_{12}O_{19}$. L. Girada et al. (J. de Physique, C1, Suppl. 4, 38 (1977), page C1-325) were the first to obtain an Sr ferrite powder having a high coercive force ($H_c = 446$ kA/m) and a specific surface area of from 3 to 4 $m^2/g$ by reacting a bulk powder consisting of a mixture of $SrCO_3$ and acicular $\alpha$-FeOOH, having a specific surface area of 13.1 $m^2/g$, at 1,050° C. in a high-temperature fluidized bed. The authors attribute the comparatively low reaction temperature required (1,050° C.), the resulting fineness of the pigments, the narrow particle size distribution obtained and the consequent high coercive force to the elaborate high-temperature fluidized bed technique employed.

It is an object of the present invention to provide an economical process for the preparation of a magnetic material which meets the demands made on a magnetic material intended for use in counterfeit-proof magnetic recording media and in plastoferrite materials. Such a material should, in particular, exhibit good dispersibility to enable it to be incorporated into organic binders, be very finely divided and have a narrow particle size distribution, and possess a high coercive force.

We have found that this object is achieved, and that, surprisingly, ferrites $MFe_{12}O_{19}$, in which M is Ba or Sr, and which have the required properties and are acicular in shape, can be prepared in a simple manner if a neutral aqueous dispersion of acicular iron(III) oxide hydroxide is reacted with an aqueous barium chloride or strontium chloride solution and a sodium carbonate solution, the resulting mixture is heated, the solid phase of the resulting dispersion is separated off from the aqueous phase, washed thoroughly, dried and comminuted, and the resulting powder is heated at from 800° to 1,070° C.

Suitable acicular iron(III) oxide hydroxides are $\alpha$-FeOOH and, in particular $\gamma$-FeOOH. These powders are particularly useful for the novel process if they have a specific surface area of from 15 to 80, preferably from 20 to 50, $m^2/g$, and the length/width ratio of the particles is from 2 to 30:1, preferably from 5 to 25:1. The preparation of these iron(III) oxide hydroxides is known. Thus, $\alpha$-FeOOH can be obtained by, for example, the procedure disclosed in German Laid-Open Application DOS No. 1,592,398, while $\gamma$-FeOOH can be prepared as described in German Published Application DAS No. 1,061,760, German Pat. No. 1,223,352 or German Laid-Open Application DOS No. 2,212,435.

To carry out the novel process, an aqueous solution of the $MCl_2$ and an aqueous sodium carbonate solution are added to the stirred aqueous dispersion of the acicular FeOOH. The molar Fe/M ratio is advantageously from 9 to 12, and the molar Na/M ratio is advantageously from 2 to 4. The reaction mixture is then heated at from 60 to 100° C. for from 0.5 to 3 hours, after which it is cooled, and the solid phase of the resulting aqueous dispersion is separated off from the aqueous phase, this usually being effected by filtration, and is washed chloride-free with water and dried. Comminution of the resulting dry material to a particle size of from 0.1 to 5, preferably from 0.1 to 1, mm is achieved by means of dry milling followed by screening. The pulverized dry material is then heated for from 0.5 to 3 hours at from 800° to 1,070° C. The material obtained is a member of the group consisting of the hexagonal ferrites, and is of the formula $MFe_{12}O_{19}$, where M is Ba or Sr.

The process according to the invention gives these ferrites directly in the form of finely divided, unsintered powders. They consist of very small acicular crystals which essentially have the crystal shape of the acicular FeOOH employed and possess a specific surface area greater than 5 $m^2/g$. If acicular $\alpha$-FeOOH is used as the starting material, the ferrites prepared according to the invention have an unexpectedly high coercive force, this being 420 kA/m in the case of $BaFe_{12}O_{19}$ and 520 kA/m in the case of $SrFe_{12}O_{19}$. This value exceeds, by more than 70 kA/m, the $H_c$ value for $SrFe_{12}O_{19}$ achieved by L. Giarda using the fluidized bed method. Moreover, we have found, surprisingly, that the use of acicular $\gamma$-FeOOH as a starting material results in hexagonal ferrite pigments having a still higher coercive force. For example, a $H_c$ value of 450 kA/m is measured in the case of $BaFe_{12}O_{19}$, while $SrFe_{12}O_{19}$ gives a value as high as 540 kA/m. Particularly advantageous is the good dispersibility of the novel ferrite pigments in organic binders, resins or polymers.

Furthermore, the process according to the invention differs from the conventional flux method in that it is possible to dispense with the use of corrosive fluxes, which also have to be subsequently washed out again. Moreover, the FeOOH needles can be coated uniformly with very finely divided $MCO_3$, where M is Ba or Sr, in a precipitation process which precedes the heating step. The advantage of coating the FeOOH needles is that short diffusion paths are provided for the subsequent solid-state reaction. This in turn results in lower reaction temperatures and better retention of the acicular shape than can be achieved with conventional milling of the starting components.

Another advantage of the novel process is that the dry mixture of $MCO_3$ and acicular FeOOH is used in comminuted form in the heating procedure. Hence, the novel process does not require any complicated compacting or tabletting techniques or any special filtration techniques, as are necessary for the preparation of moldings with mechanical orientation of the FeOOH needles.

Furthermore, the novel process does not require any special, elaborate sintering techniques, such as a high-temperature fluidized bed technique, for heating the mixture of $MCO_3$ and FeOOH. Instead, heating is carried out by a conventional method, for example in crucibles, dishes or tubular rotary furnaces. The surprising advantage of this is that the reaction temperatures in the novel process are lower than those in the conventional heating procedure.

The advantageous particle properties result in both good mechanical properties and improved dispersion behavior in organic binders, resins and polymers. Because of this good dispersibility, the ferrite pigments prepared according to the invention are particularly useful as magnetic material in the production of magnetic recording media and of magnetic plastoferrites. The ferrite powders prepared according to the invention are so finely divided that the magnetic layers prepared therewith exhibit an outstandingly smooth surface even in the case of thin layers. Furthermore, compared with conventional, coarser ferrite products, the finely divided ferrite powders prepared according to the invention exhibit improved magnetic properties in magnetic recording media and in plastoferrites. For example, when the hexagonal ferrite powders prepared according to the invention are incorporated into an organic matrix, their high coercive forces are fully retained, so that magnetic recording media and magnetic plastoferrite materials having very high coercive forces of up to about 550 kA/m can be produced. Tape-coating experiments to produce magnetic recording tapes have shown that the coercive force can even increase by as much as 30 kA/m when a ferrite powder prepared according to the invention is incorporated into an organic binder. By contrast, the coercive force of conventional, coarser ferrite powders prepared by a ceramic method decreases very sharply when they are incorporated into an organic matrix material under similar dispersing conditions. This is due to mechanical destruction of the ferrite particles.

Because of the high $H_c$ values of the ferrite/polymer composite materials which can be prepared according to the invention, it is difficult to alter a magnetic recording or permanent magnetization once it has been effected, so that a stable permanent magnetic state is achieved. Hence, magnetic recordings in magnetic recording media are substantially insensitive to stray fields and are consequently substantially forgery-proof. In the case of print-through-echo-erasing means, which can advantageously be manufactured with the plastoferrite particles prepared according to the invention, the permanent magnetic state usually produced by magnetization by a discharge capacitor using a high field strength is completely unaffected by the demagnetizing fields produced by the magnetic tape running past these means. Hence, when the echo-erasing means manufactured according to the invention from plastoferrite material having a high coercive force are employed, the signal to print-through ratio is greatly improved.

The Examples which follow illustrate the invention.

EXAMPLE 1

A dispersion consisting of 50.00 kg of acicular $\alpha$-FeOOH having a specific surface area of 27 m$^2$/g and a length/width ratio of 10:1 and 500 l of water was prepared with vigorous stirring, and a solution of 12.835 kg of BaCl$_2$.2H$_2$O in 50 l of water was added. A solution of 7.167 kg of Na$_2$CO$_3$ in 40 l of water was then added with continued stirring, and the resulting dispersion was heated at 90° C. for 2 hours, while stirring, after which it was cooled and the solid phase of the dispersion was filtered off by means of a conventional filter press, washed chloride-free with water and dried. The dry material obtained was dry-milled in a mill and then passed through a sieve having a mesh size of 0.3 mm. The comminuted, screened powder was heated in a stainless steel dish for 1 hour at 1,000° C. and then cooled. The resulting BaFe$_{12}$O$_{19}$ preparation, which was shown by the X-ray pattern to be a single phase, consisted of acicular ferrite particles having a specific surface area of 7.5 m$^2$/g. The coercive force ($H_c$) was 423 kA/m, and the specific remanent magnetization ($M_r/\rho$) was 42 nTm$^3$/g.

EXAMPLE 2

A dispersion consisting of 4.00 kg of acicular $\alpha$-FeOOH having a specific surface area of 32 m$^2$/g and a length/width ratio of 10:1 and 40 l of water was prepared with vigorous stirring, and a solution of 1.121 kg of SrCl$_2$.6H$_2$O in 4 l of water was added. A solution of 0.5793 kg of Na$_2$CO$_3$ in 3 l of water was then added with continued stirring, and the resulting dispersion was heated at 90° C. for 2 hours, while stirring, after which it was cooled and the solid phase of the dispersion was filtered off, washed chloride-free with water and dried. The dry material obtained was dry-milled in a mortar and then passed through a sieve having a mesh size of 0.3 mm. The comminuted, screened powder was heated in a stainless steel dish for 1 hour at 1,000° C. and then cooled. The resulting SrFe$_{12}$O$_{19}$ preparation, which the X-ray pattern showed to be a single phase, consisted of acicular ferrite particles having a specific surface area of 8.5 m$^2$/g. The coercive force was 521 kA/m, and the specific remanent magnetization was 43 nTm$^3$/g.

EXAMPLE 3

A dispersion consisting of 4.00 kg of acicular $\gamma$-FeOOH having a specific surface area of 32.8 m$^2$/g and a length/width ratio of 20:1 and 60 l of water was prepared with the aid of an Ultra Turrax dispersing apparatus from Kotthoff, and a solution of 1.020 kg of BaCl$_2$.2H$_2$O in 4 l of water was added. A solution of 0.575 kg of Na$_2$CO$_3$ in 3 l of water was then added with continued stirring, and the resulting dispersion was further treated as described in Example 2. Heating for one hour at 970° C. gave a BaFe$_{12}$O$_{19}$ preparation which was shown by the X-ray pattern to be a single phase and consisted of acicular ferrite particles having a specific surface area of 8.1 m$^2$/g. The coercive force was 450 kA/m, and the specific remanent magnetization was 42 nTm$^3$/g.

EXAMPLE 4

A dispersion consisting of 4.000 kg of acicular $\gamma$-FeOOH having a specific surface area of 32.8 m$^2$/g and a length/width ratio of 20:1 and 60 l of water was prepared with the aid of an Ultra Turrax dispersing apparatus from Kotthoff, and a solution of 1.113 kg of SrCl$_2$.6H$_2$O in 4 l of water was added. A solution of 0.575 kg of Na$_2$CO$_3$ in 3 l of water was then added with continued stirring, and the resulting dispersion was further treated as described in Example 2. Heating for 1 hour at 950° C. gave an SrFe$_{12}$O$_{19}$ preparation which was shown by the X-ray pattern to be a single phase and consisted of acicular ferrite particles having a specific surface area of 8.7 m$^2$/g. The coercive force was 539 kA/m and the specific remanent magnetization was 44 nTm$^3$/g.

EXAMPLE 5

In a PR 46 Ko kneader from Buss, without a discharge screw, 3.75 kg/h of barium ferrite powder from Example 1 were metered into a stream of 1.25 kg/h of a nylon melt consisting of Ultramid A3 from BASF AG, stabilized with 200 ppm of CuI and 800 ppm of KI, at 280° C., and the mixture was continuously kneaded and extruded. The barium ferrite powder and the polymer granules were fed into the Ko kneader by means of differential metering balances from K-tron Soder GmbH. The resulting plastoferrite material was cooled and then milled using a cutter mill. The granules were injection molded using an Allrounder 200 injection molding machine from Arburg at a melt temperature of 305° C. and a mold temperature of 80° C. to give small cylindrical plastoferrite rods having a diameter of 1.8 mm and a length of 5 mm. The barium ferrite content of the plastoferrite rods was determined by ashing at 400° C., and found to be 75% by weight. The coercive force was 421 kA/m and the residual magnetization was 76 mT. A cylindrical rod was permanently magnetized at right angles to the cylinder axis in a magnetic field of 800 kA/m. It was fitted in a magnetic tape cassette so that the magnetic field produced by the plastoferrite rod was at right angles to the magnetic tape running past it at a distance of 0.8 mm. The print-through-echo-erasing means increased the signal to print-through ratio by 8 dB.

EXAMPLE 6

Using the procedure described in Example 5, plastoferrite rods were prepared from 75% by weight of barium ferrite powder from Example 1 and 25% by weight of Lupolen 5021 D high density polyethylene produced by BASF AG. The melt temperature in the Ko kneader was 190° C., while that in the injection molding machine was 255° C. The coercive force of the injection-molded magnetic rods was 420 kA/m, and the residual magnetization was 67 mT. The print-through-echo-erasing means increased the signal to print-through ratio by 6 dB.

EXAMPLE 7

6 kg of a commercial synthetic barium ferrite having a coercive force of 120 kA/m and a specific surface area of 1 m$^2$/g were wet-milled for 15 minutes, with the addition of 1 l of water, in a Molinex PE 5 high-performance pulverizer from Netsch, with the aid of 15 kg of steel balls (diameter 2-3 mm), at 1,500 rpm. The solid phase of the resulting aqueous dispersion was filtered off and dried, and the finely divided barium ferrite product was then heated for 1 hour at 1,020° C. The barium ferrite powder obtained had an H$_c$ value of 300 kA/m and a specific surface area of 2.3 m$^2$/g. It was then incorporated into Ultramid as described in Example 5, the degree of filling being 88% by weight.

The coercive force of the plastoferrite granules was 180 kA/m. Hence, when the ferrite powder prepared by the ceramic method is incorporated into plastic, the coercive force decreases by 40%.

We claim:

1. A process for the preparation of a finely divided acicular hexagonal ferrite which has a high coercive force and is of the formula MFe$_{12}$O$_{19}$, where M is barium or strontium, which consists essentially of reacting an aqueous dispersion of acicular iron(III) oxide hydroxide with an aqueous MCl$_2$ solution and a sodium carbonate solution, the amount of Na and M in the solutions providing an Na/M ratio of 2 to 4, the resulting mixture is heated, the solid phase of the resulting disperson is separated off from the aqueous phase, washed thoroughly, dried and comminuted, and the resulting powder is heated at from 800° to 1,070° C.

2. A process for the preparation of a finely divided acicular hexagonal ferrite which has a high coercive force and is of the formula MFe$_{12}$O$_{19}$, where M is barium or strontium, as set forth in claim 1, wherein the acicular iron(III) oxide hydroxide is $\alpha$-FeOOH.

3. A process for the preparation of a finely divided acicular hexagonal ferrite which has a high coercive force and is of the formula MFe$_{12}$O$_{19}$, where M is barium or strontium, as set forth in claim 1, wherein the acicular iron(III) oxide hydroxide is $\gamma$-FeOOH.

4. A process as claimed in claim 1 wherein the acicular FeOOH employed has a specific surface area of from 15 to 80 m$^2$/g and a length/width ratio of from 2 to 30.

5. A process as set forth in claim 1 wherein the thoroughly washed and dried solid phase is subjected to heating in a comminuted form having a particle size of from 0.1 to 5 mm.

6. A process as set forth in claim 1 wherein the thoroughly washed and dried solid part is subjected to heating in a comminuted form having a particle size of from 0.1 to 1 mm.

7. The process of claim 2, wherein the acicular FeOOH employed has a specific surface area of from 15 to 80 m$^2$/g and a length/width ratio of from 2 to 30.

8. The process of claim 3, wherein the acicular FeOOH employed has a specific surface area of from 15 to 80 m$^2$/g and a length/width ratio of from 2 to 30.

9. The process of claim 2, wherein the thoroughly washed and dried solid phase is subjected to heating in a comminuted form having a particle size of from 0.1 to 5 mm.

10. The process of claim 3, wherein the thoroughly washed and dried solid phase is subjected to heating in a comminuted form having a particle size of from 0.1 to 5 mm.

11. The process of claim 2, wherein the thoroughly washed and dried solid part is subjected to heating in a comminuted form having a particle size of from 0.1 to 1 mm.

12. The process of claim 3, wherein the thoroughly washed and dried solid part is subjected to heating in a comminuted form having a particle size of from 0.1 to 1 mm.

13. The process of claim 1, wherein the Fe/M ratio is 9 to 12.

14. The process of claim 2, wherein the Fe/M ratio is 9 to 12.

15. The process of claim 3, wherein the Fe/M ratio is 9 to 12.

* * * * *